UNITED STATES PATENT OFFICE.

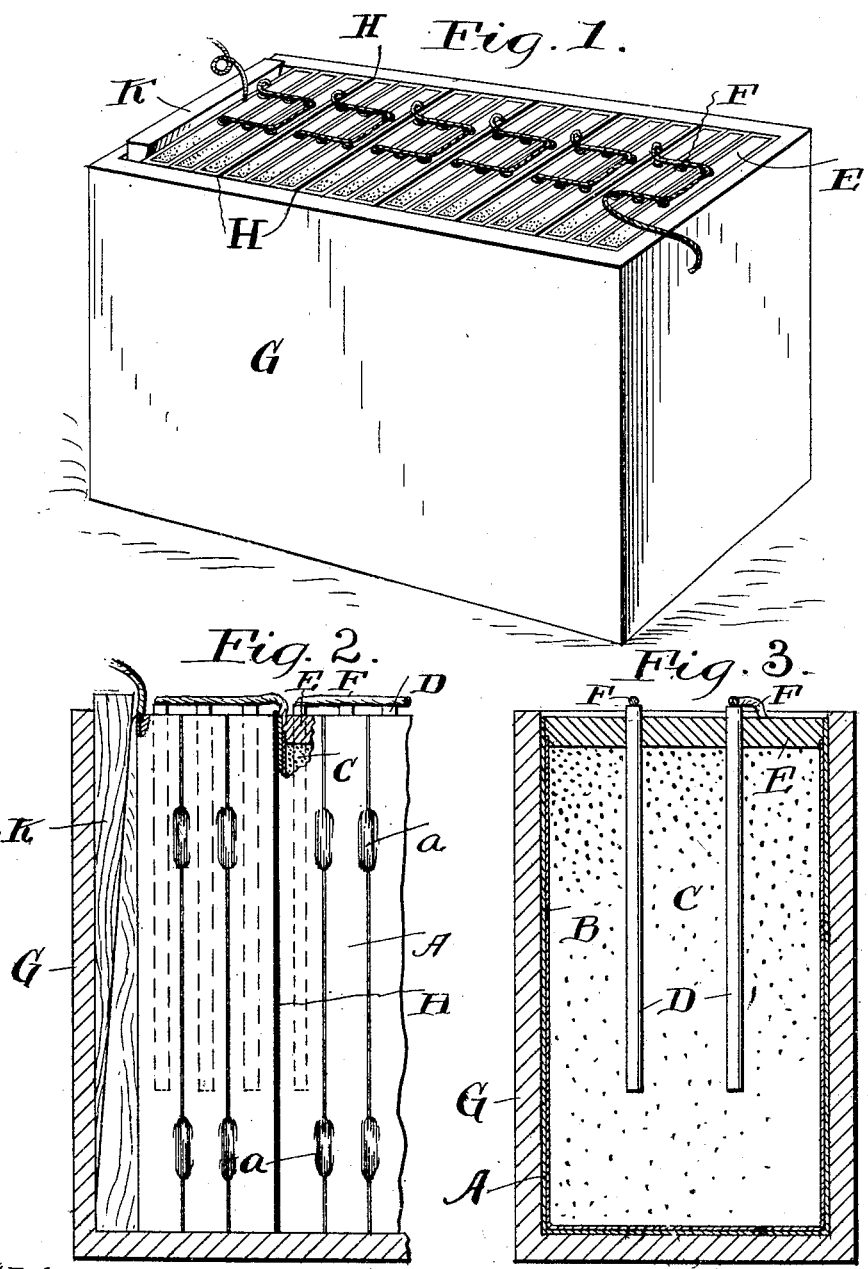

DANIEL L. ORDWAY AND JOHN W. BROWN, OF LAKEWOOD, OHIO, ASSIGNORS TO NATIONAL CARBON COMPANY, OF CLEVELAND, OHIO, A CORPORATION OF NEW JERSEY.

DRY BATTERY.

1,011,992.   Specification of Letters Patent.   Patented Dec. 19, 1911.

Application filed October 23, 1909. Serial No. 524,105.

*To all whom it may concern:*

Be it known that we, DANIEL L. ORDWAY and JOHN W. BROWN, citizens of the United States, and residents of Lakewood, in the county of Cuyahoga and State of Ohio, have invented a certain new and useful Improvement in Dry Batteries, of which the following is a full, clear, and exact description.

This invention relates to improvements in dry cells and in batteries of such cells, especially adapted for use on automobiles and motor boats run by internal combustion engines, for the purpose of supplying the current for the ignition systems of such engines.

Broadly speaking, the object of the invention is to provide a dry battery which will give the greatest number of hours of effective service for the cubic space which it occupies.

More particularly the object of the invention is to provide a dry battery which can be conveniently put into and removed from the space ordinarily provided on an automobile for the current generator which will give a greater number of hours of effective service than any other form of dry battery adapted to be stored in such space.

The invention consists in the individual dry cell hereinafter shown and described; and in the described battery of such cells, as definitely pointed out in the appended claims.

In the drawing, Figure 1 is a perspective view of a battery composed of six battery units connected in series, each unit comprising three of the described cells connected in parallel. Fig. 2 is a front or edge view of two of the said units showing an insulating sheet between them; and Fig. 3 is a central sectional view of one cell.

Each dry cell as shown includes a zinc cup A which is in the form of a rectangular parallelepiped. Having in mind the fact that these batteries are intended primarily for use on automobiles, they are preferably made about eight inches high and above five inches wide. These dimensions have been selected because a battery made up of cells of these dimensions is well adapted to the space usually available on automobiles for the storage of the ignition system batteries. These proportions, however, may be varied within pretty wide limits without departure from the invention. The thickness of these cells is preferably about five-eighths of an inch outside measure. This thickness has been determined upon as the result of experiments which show that if the cell is much thinner it cannot contain enough battery mix for the coöperation with the exposed zinc surfaces; and if the cell is made much thicker there will be required to fill it more of the battery mix than is actually required for coöperation with the exposed zinc surfaces. The dimensions stated, namely, five-eighths of an inch by five by eight inches outside measurement are those which produce a cell of a size especially adapted for the intended use, and which will be able to contain enough, but not too much, of the battery mix. Within this zinc cup is the usual porous lining B of pulp board or its equivalent. A filling C of the usual battery mix is tightly packed in this zinc cup. One or more carbon rods D, which serve as current collectors, are embedded in this filling; and they project out of the top of the cup through the usual seal E. It might be here stated that when the battery mix is packed into one of these cups, the cup should be held in a form which will prevent the cup from being forced out of shape by the internal pressure of the mix.

In making up a battery of the described cells particularly adapted for the stated use, the best results are obtained by laying three of these cells flat side against flat side and connecting them by solder or other appropriate means as at *a*. The zinc elements are thereby connected electrically; and all of the projecting carbon collectors are likewise connected electrically as by a wire F. These three cells, so connected in multiple, constitute a battery unit. Six of these units are packed tightly in a suitable box G. They lie flat side against flat side except that a sheet of some insulating material H as, for example, wax paper, is placed between the units so as to insulate them from each other. When the six units are placed in the box G, they should be put under pressure as for example by wedges K so that they may hold their shape. If it were not for this the internal pressure of the packed mix might bow the sides of the cups outward. This would enable the mix to become loose in the cups, and thereby less efficient. These six units so confined in a box G are now connected in series to form the battery, which battery exclusive of the box, will occupy a space of about 500 cubic inches. A battery of six standard cylindrical dry cells, eight inch size, will require about 600 cubic inches of space. Comparative tests of these two batteries,—one made up of six units of the flat cells, as stated, and the other of six of the eight inch round cells, shows that the former will give about twice as many hours of effective service as the latter. It might be added that the flat cell battery has nearly twice as much exposed zinc surface, but contains not quite as much battery mix as the round cell battery. It might also be added that one of the flat cell units, comprising three cells connected in parallel, has an initial amperage of about 50 amperes, while an ordinary eight inch round cell has an initial amperage of about 25 amperes.

Probably the flat cell batteries will cost a little more than the round cell batteries, but this is not a matter of much importance in view of the fact that with the flat cells one can confine in a given cubic space nearly twice as many hours of effective service as is possible with the round cell dry batteries.

Having described our invention, we claim:

1. A battery unit comprising a plurality of dry batteries composed of the usual elements, each battery having the form of a thin parallelepiped, the said batteries being arranged with their flat surfaces parallel and the surfaces of adjacent batteries being in contact, the casings of said batteries being electrically connected to each other and the projecting electrodes being connected with each other, and means for applying a pressure to the said batteries to hold their flat surfaces in parallel relation.

2. A battery comprising a containing casing, a plurality of units arranged within said casing and each unit insulated from its adjacent unit, each of the said units comprising a plurality of dry batteries having the usual elements, the outer casings of said batteries being formed as thin rectangular parallelepipeds, the casings of the batteries in each unit being in electrical communication with each other and the projecting poles of the batteries in each unit being in electrical connection with each other, and means situated at one end of the casing for applying pressure to the sides of the dry batteries comprising the units, for the purpose described.

In testimony whereof, we hereunto affix our signatures in the presence of two witnesses.

DANIEL L. ORDWAY.
JOHN W. BROWN.

Witnesses:
   GEO. M. SMITH,
   CHAS. W. SANFORD.